(No Model.)
L. W. LINDLEY.
WIRE FENCE.
No. 246,797. Patented Sept. 6, 1881.
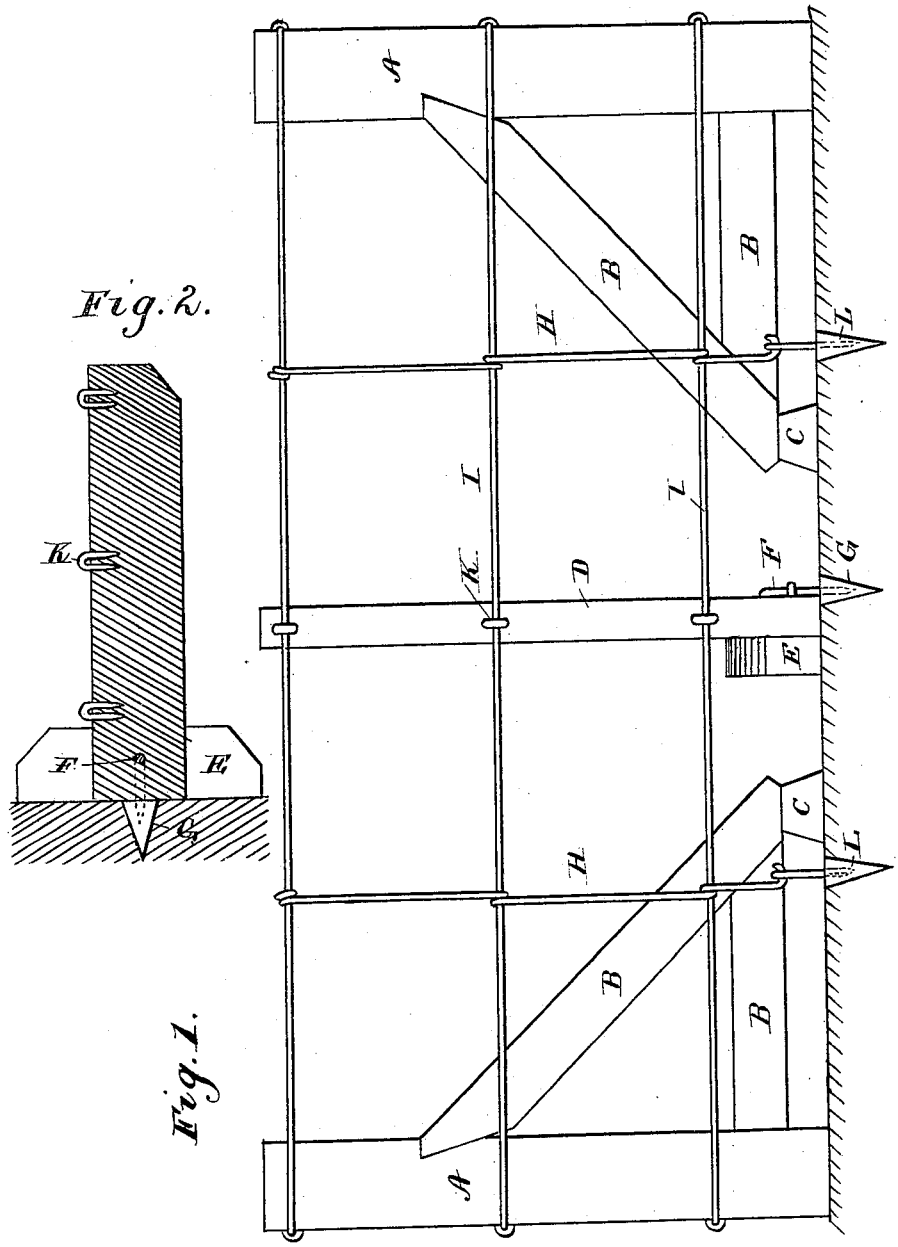
Witnesses,
Edwin L. Yewell
J. J. McCarthy
Inventor
Lafayette W. Lindley,
By C. M. Alexander
Attorney.

UNITED STATES PATENT OFFICE.

LAFAYETTE W. LINDLEY, OF BOYLE COUNTY, KENTUCKY.

WIRE FENCE.

SPECIFICATION forming part of Letters Patent No. 246,797, dated September 6, 1881.

Application filed October 29, 1880. (No model.)

*To all whom it may concern:*

Be it known that I, LAFAYETTE W. LINDLEY, a citizen of the United States, residing in the county of Boyle and State of Kentucky, have invented a new and useful Improvement in Barb-Wire Fences, of which the following is a specification.

This invention has for its objects to compensate for the expansion and contraction in wire fences, and to provide for securely stretching and fastening the wires thereof. These objects I attain by the devices illustrated in the accompanying drawings, in which—

Figure 1 represents a side elevation, and Fig. 2 a transverse vertical section, of my fence.

The letter A indicates the fence-posts, which are set in the ground, as usual.

B indicates a triangular brace, secured to each fence-post, having its horizontal portion at one end resting upon a suitable support, C, laid upon the ground. At proper intervals between the posts are located vertical props D, which are secured to transverse beams E, fastened by staples F secured to the stakes G driven in the ground.

The letter H indicates a series of vertical wires located between the posts and props and secured to the horizontal fence-wires I. The said wires I are secured to the posts and the props by suitable staples, K, in the usual manner. The vertical wires are secured at their lower ends to stakes L driven in the ground.

It will be seen that as constructed the posts form a substantial support for the barbed wires, while the props and vertical wires serve to support and connect the barbed wires at intermediate points, while at the same time they will allow said barbed wires to contract and expand readily under changes of temperature.

Having thus described my invention, what I claim, and desire to secure by Letters Patent, is—

The combination, in a wire fence, of the supporting-posts, constructed of wood or metal, and their braces and rests, the intermediate props and their transverse beams stapled to stakes driven in the ground, and the vertical wires secured to similar stakes, and the horizontal wires secured to the posts, props, and vertical wires, substantially as and for the purposes specified.

LAFAYETTE W. LINDLEY.

Witnesses:
H. K. FORBIS,
GEO. S. BROWN.